(12) United States Patent
Kodak

(10) Patent No.: US 9,445,964 B1
(45) Date of Patent: Sep. 20, 2016

(54) MODULAR CASKET WITH TENSION CABLE SYSTEM

(71) Applicant: James Allen Kodak, Odenton, MD (US)

(72) Inventor: James Allen Kodak, Odenton, MD (US)

( * ) Notice: Subject to any disclaimer, the term of this patent is extended or adjusted under 35 U.S.C. 154(b) by 0 days.

(21) Appl. No.: 14/730,903

(22) Filed: Jun. 4, 2015

(51) Int. Cl.
*A61G 17/007* (2006.01)
*A61G 99/00* (2006.01)
*A47B 43/00* (2006.01)
*A61G 17/04* (2006.01)

(52) U.S. Cl.
CPC .............. *A61G 17/007* (2013.01); *A47B 43/00* (2013.01); *A61G 17/0076* (2013.01); *A61G 99/00* (2013.01); *A61G 2017/044* (2013.01)

(58) Field of Classification Search
CPC .................. A61G 17/00; A61G 17/04; A61G 2017/044; A61G 17/007; A61G 17/0076; A61G 99/00; A47C 19/025; A47C 23/12; A47C 23/22; A47C 23/26; A47B 43/00
USPC ...................................... 27/2, 4, 12; 5/200.1
See application file for complete search history.

(56) References Cited

U.S. PATENT DOCUMENTS

| | | | | |
|---|---|---|---|---|
| 2,839,814 A * | 6/1958 | Harter | ..................... | A61G 17/04 27/12 |
| 3,539,142 A * | 11/1970 | Moran | ..................... | A61G 17/04 248/125.1 |
| 3,692,267 A * | 9/1972 | Kronas | ................. | A47C 20/042 248/288.11 |
| 3,924,309 A | 12/1975 | Andrus | | |
| 4,800,631 A | 1/1989 | Pellmann | | |
| 4,881,206 A * | 11/1989 | Kadono | .................... | G11C 7/22 365/189.04 |
| 6,434,804 B1 * | 8/2002 | Cornet | .................. | A47C 19/025 27/2 |
| 6,463,651 B1 * | 10/2002 | Koeneker | ............ | A47C 19/021 29/513 |
| 7,222,400 B2 | 5/2007 | Leverett | | |
| 7,730,595 B2 | 6/2010 | De La Fuente | | |
| 8,291,556 B2 | 10/2012 | Brownlow | | |
| 8,443,496 B2 | 5/2013 | De La Fuente | | |
| 8,584,327 B1 | 11/2013 | Kodak | | |

* cited by examiner

Primary Examiner — William Miller

(57) ABSTRACT

This design for a modular casket uses a tension cable system to function as the weight bearing floor for the interior. The cable weaves through eyepieces mounted to either stanchions or side panels to form a zigzag webbing along the bottom of the casket and tension is applied to the cable using a ratchet. The interior flooring is completed by laying a sheet of foam over the cable webbing on top of which the casket's mattress is laid. Both the lid and the base are comprised of four partitions that are either flexibly attached to one another to enable a compact accordion like fold or are separate pieces which easily align. In both the wood and steel versions of this design, the caskets are fully assembled without the use of tools.

11 Claims, 20 Drawing Sheets

MODULAR CASKET WITH TENSION CABLE SYSTEM

BACKGROUND OF THE INVENTION

Caskets are fundamentally bulky items and are thus expensive to ship. Modularity of casket design enhances shipment by breaking down the otherwise bulky casket into a plurality of pieces that can be easily transported in boxes of modest dimensions. However, modularity necessitates assembly that may prove too time-consuming or too complex for many end point users. Additionally, building modular caskets may prove a disruptive departure from the normal casket making process and thus deter manufacturers from pursuing the benefits of modularity. Therefore, any workable design must be very easy to both manufacture and assemble. Ideally, a modular casket should be easily assembled and disassembled without the out of tools.

Since the advantages of modularity are obvious, efforts in pursuit thereof are nothing new. U.S. Pat. No. 3,924,309 divides a casket into its canopy, body, and base that allows for a relatively fast assembly. U.S. Pat. No. 4,800,631 discloses strips of hinged panels with mutually cooperative flanges that enable the panels to be held rigid and form the casket body. More recent efforts sometimes succeed at breaking the casket parts down to more manageable sizes, but either the manufacture of the parts is too costly, see U.S. Pat. No. 8,584,327 that relies on numerous rare-earth permanent magnets, or the designs are dependent on materials that are not acceptable to the market, see U.S. Pat. Nos. 7,222,400; 7,730,595; 8,291,556; and 8,443,496.

SUMMARY OF THE INVENTION

One object of this invention is to provide a modular casket design that can be manufactured and shipped at very low cost. A second object of this invention is to enable fast and easy assembly by any user without the use of tools. A third object of this invention is to provide manufacturers with an alternative method of casket body fabrication that can be applied generally, even to high end wood and steel casket models. This invention discloses a modular casket that makes use of a tension cable system that functions as an interior floor and provides additional rigidity to the seating of the side panels. The interior floor provided by the cable system supplants the need for a robust weight bearing base by transferring said weight to the side panels. Furthermore, the elevated cable floor negates any requirement for a bed frame. As this design involves a fundamentally different approach to casket construction, detailed wood and steel casket embodiments are herein offered.

The preferred embodiment for a casket made of wood or other non-metal material is comprised of 22 separate parts: 6 identical side panels, 2 identical end panels, 4 lid pieces, 1 base piece, 1 tension cable, and 8 hinge pins. The base piece is comprised of four planar partitions flexibly attached to one another so as to allow a complete accordion fold resulting in a neat and compact stack of the partitions. All panels attach to the base piece through a tongue and groove system. The side panels are connected and held rigid with either a single tension cable or a series of them. The cable connects to the panels by running through eyepieces mounted on the interior side of each panel. To prevent shear forces from separating the panels, each panel is also attached to each adjacent panel using pin inserted hinges. The four partitions comprising the lid slide onto the top of the casket box following a groove carved across the upper exterior of each panel.

The preferred embodiment for a straight rectangular steel casket can be made almost entirely of sheet metal. The base is comprised of four square brackets with C-shaped cross-sections that readily align with each other. Eight stanchions are mounted within the base and eight steel panels connect in between the stanchions to complete the box. All connections are made with winged nuts and either bolts or welded studs. The support for the interior of the casket is formed by a single cord or cable that weaves through eyepieces connected to the stanchions and is tightened with a ratchet. The lid is comprised of four partitions flexibly connected with two elastic bands that each run through the interiors of the two panels comprising each lid partition. This lid design enables an accordion like fold that enhances modularity and also permits but a variety of viewing modalities.

To accommodate contoured steel casket designs, both the stanchions and panels must lack the lateral flanges seen in the sheet metal design so that both may be shaped using standard press means. The stanchions, both on the corners and on the sides, will preferably be a single flat bar that must be contoured to match the contours of the panels on either side of the stanchion. Since the contoured stanchion cannot be strengthened by lateral flanges, matching the strength and rigidity of the sheet metal stanchion requires a different grade or thicker piece of steel.

BRIEF DESCRIPTION OF THE DRAWINGS

Although similar in part number and organization, three different embodiments of the present invention will now be described in order to accommodate the fundamentally different physical properties of the materials used in casket manufacturing, wherein like reference numerals refer to like elements in the several figures, and wherein.

DETAILED DESCRIPTION OF THE INVENTION

Figure 1:
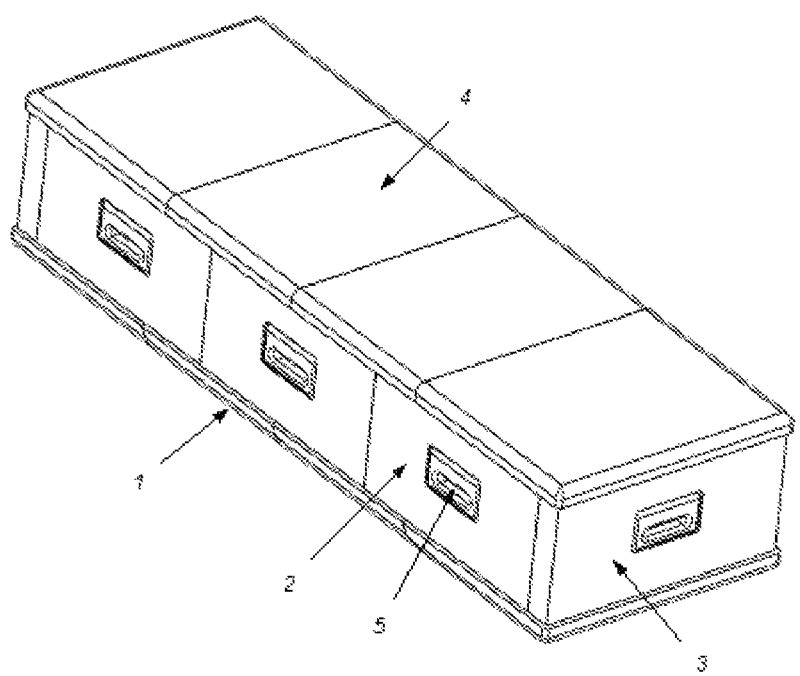
FIG. 1 is a perspective view of the whole wood casket.

The preferred embodiment for a modular casket made of wood or other non-metallic substance is shown in FIG. 1. It is generally rectangular and consists of a base 1 that is partitioned into four rigid partitions of equal dimension. Attaching to the base 1 are eight vertical panels: six equivalent side panels 2, three on each long side, and two equivalent end panels 3, one on each short side. The lid of the casket 4, like the base, is also comprised of four partitions of equal dimension. Each of the panels possesses an inset, fold-out handle 5.

Figure 2:
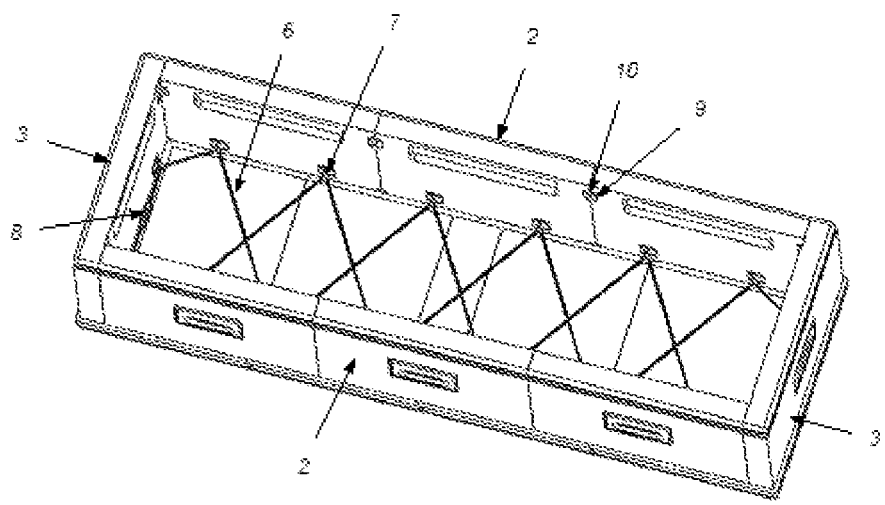
FIG. 2 is a perspective view of the wood casket with the lid removed.

FIG. 2 is a perspective view of the casket with the lid removed. Opposite side panels 2 and opposite ends panels 3 are connected and held rigid using a tension cable system. A single tension cable 6 weaves through eyepieces 7 mounted on the interior side of each panel. The cable is tightened using a ratchet 8. The cable 6 is preferably composed of woven nylon fiber as this material is light, strong, inexpensive and should exhibit very low friction with the metallic eyepieces 7 during the weaving and tightening process. The panels posses complementary half hinges 9 that are mounted laterally and are held in place with the insertion of hinge pins 10. Since the breadth of the end panels 3 overlaps with the thickness of the side panels 2, to enable mating, the half-hinges 9 on the end panels 3 are mounted in a more medial location than the side panels 2.

The completed web of cable holds the panels rigid and functions as the floor for all of the casket's interior contents. This design, by utilizing the intrinsic strength of the panels, negates the need for a robust casket base. Furthermore, the cable web can supplant the need to insert a bed frame into the casket. To adjust the height of the deceased during viewing, foam mats with differing thicknesses can be laid over the web and under the mattress.

Figure 3:
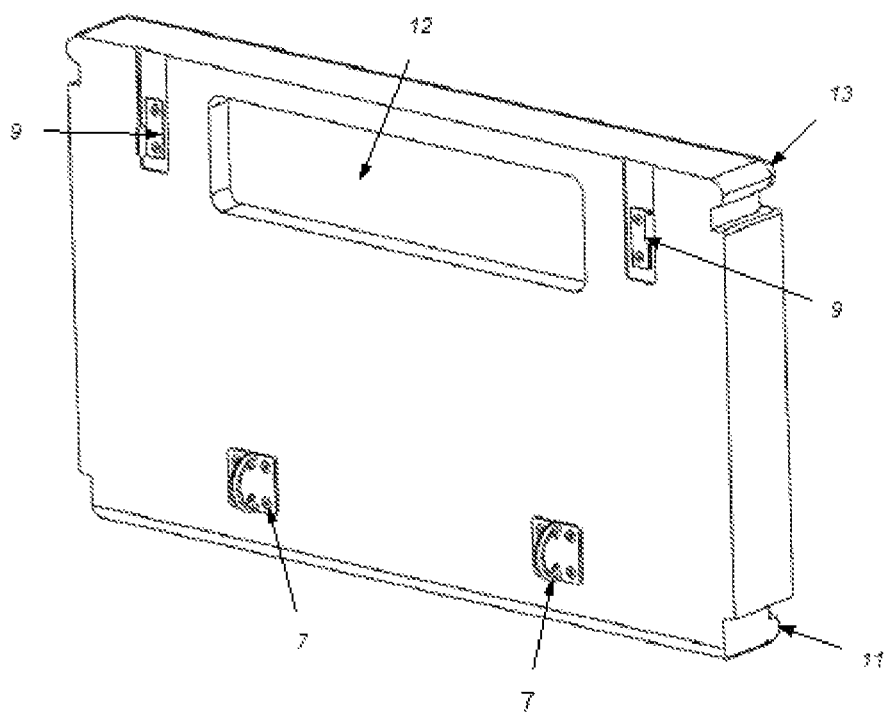
FIG. 3 is a perspective view of a wood end panel's interior face.

FIG. 3 is a perspective view of the interior face of an end panel 3. There are two metallic eyepieces 7 mounted near the bottom of the panel. Half-hinges 9 that mate with the half-hinges on the lateral edges of the side panels are mounted towards the top. At the very bottom, there is a base groove 11 facing the exterior and running along the entire breadth of the panel. Between the half-hinges 9 there is a large upper-interior groove 12 cut out of the panel. One purpose of the upper-interior groove is to enable compact and scratch-less packing of the panels during shipping as the eyepieces 7 of another panel can easily insert into it. The upper-interior groove 12 can also be used to anchor any interior lining should the lining be equipped with a foam backing of appropriate dimensions enabling tight insertion into the groove. Lastly, the end panel possesses a lid groove 13 along the upper exterior and sides of the panel. The base and the lid grooves are formed by routing them out of each panel.

Figure 4:
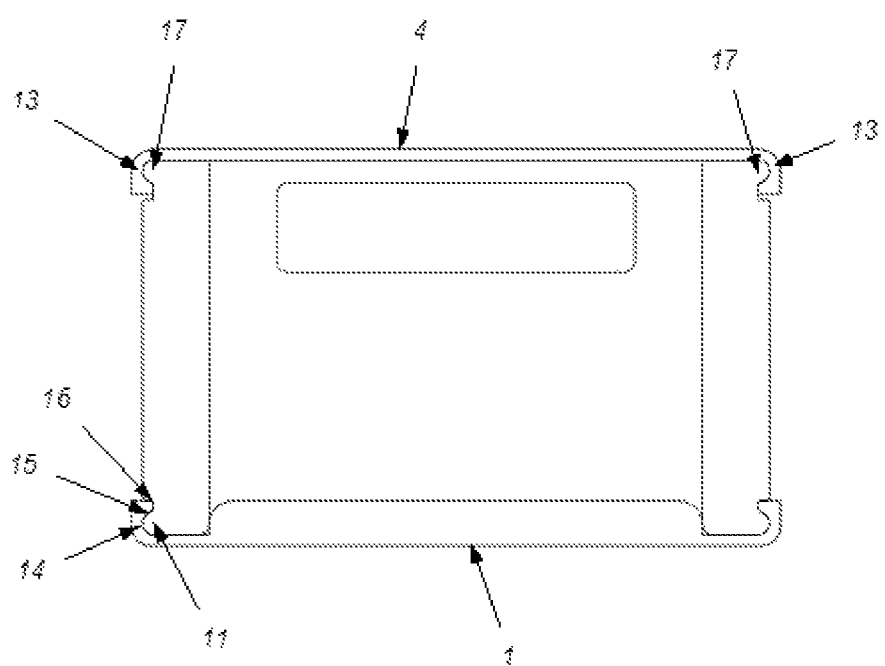
FIG. 4 is a side sectional view of the wood casket showing how the panels connect to the base and lid.

FIG. 4 is a widthwise cross-sectional view of the casket. This view demonstrates how the panels are attached to both the base 1 and the lid 4 using tongue and groove joints. The bottom of each panel rocks into a track 14 cut out of the perimeter of the base 1. The rocking motion is facilitated by a curved edge 15 running along the top proximal side of the track 14. A base tongue 16 running along the periphery of the base and directed towards the interior interlocks with the base groove 11 and this prevents separation once all panels are in place. The lid 4 is affixed to the panels in a similar manner. A lid tongue 17 emanating from the periphery of the lid 4 and directed towards the interior enables each lid partition to slide along the lid grooves 13 in each panel while preventing vertical separation.

Figure 5:
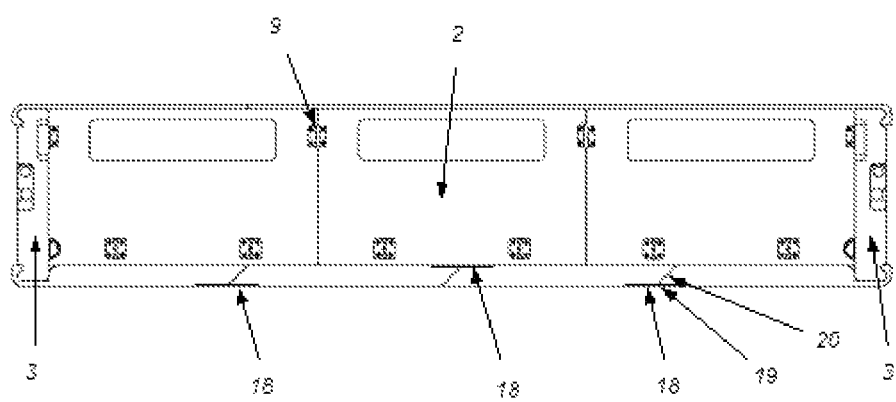
FIG. 5 is a front sectional view of the wood casket showing the connections between the panels and the flexible connections between the partitions comprising the base.

FIG. 5 is a lengthwise cross-sectional view that shows how the side panels 2 and end panels 3 interconnect with adjacent panels using a hinge. Half of each hinge 9 is mounted on the upper interior periphery of each side panel 2. Hinge-pins 10 complete the connection between each side panel 2 in addition to the previously mentioned connection between the side panels 2 and end panels 3. This view also shows how to achieve the accordion fold of the base partitions. Fabric strips 18 are affixed to the base in a bottom-top-bottom arrangement at the three partition joints 19 and the beveling 20 of the partitions at the joints enables a 180 degree fold between the partitions.

Figure 6:
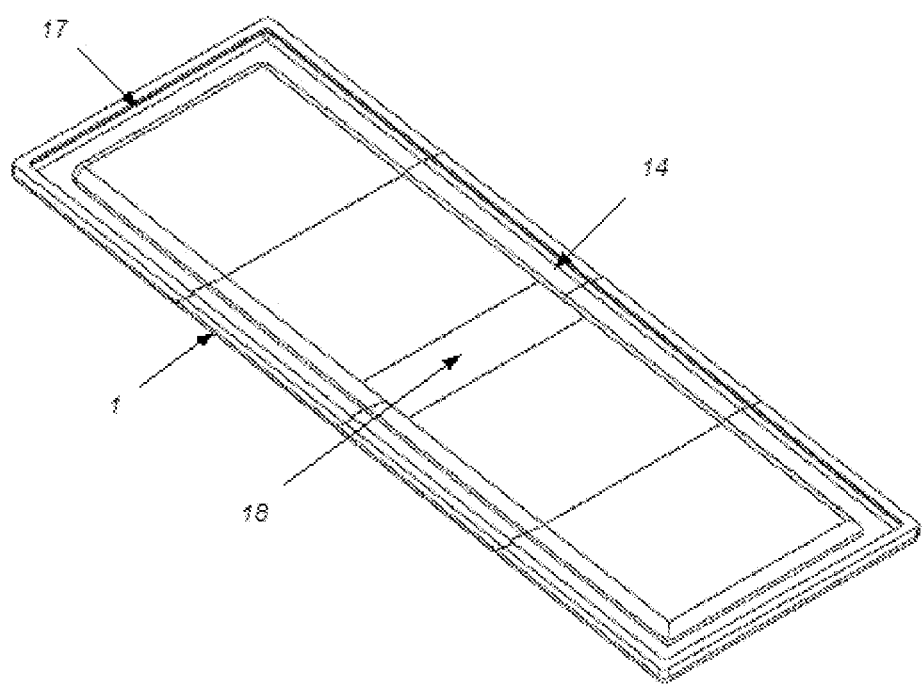
FIG. 6 is a perspective view of the wood base.

FIG. 6 is a perspective view of the base 1. The track 14 running along the distal region of the base 1 is where the panels are placed. The lid tongue 17 defines the outer edge of the track. Only the top, middle fabric strip 18 is visible from this top view. Since the weight bearing function of this tension cable casket is borne by the cable, eyepieces and side panels, it is no longer necessary for the base to possess any robustness beyond what may be necessary for aesthetics.

Figure 7:
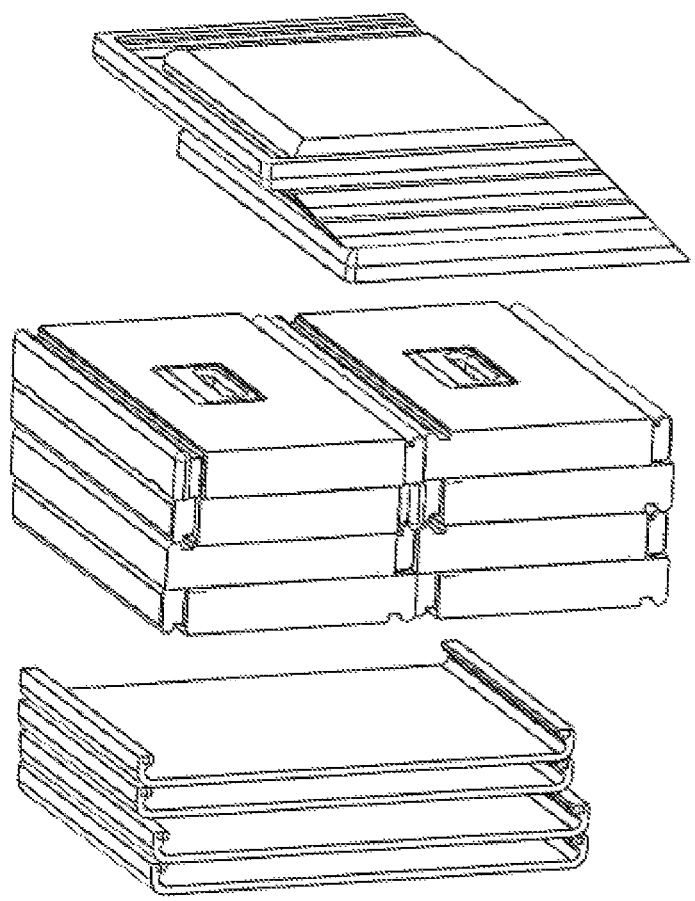
FIG. 7 is a perspective view of the wood base, wood panels and wood lid partitions stacked in their most compact form for shipping.

FIG. 7 shows how the base, panels, and lid partitions can be stacked so as to minimize the shipping volume.

Figure 8:
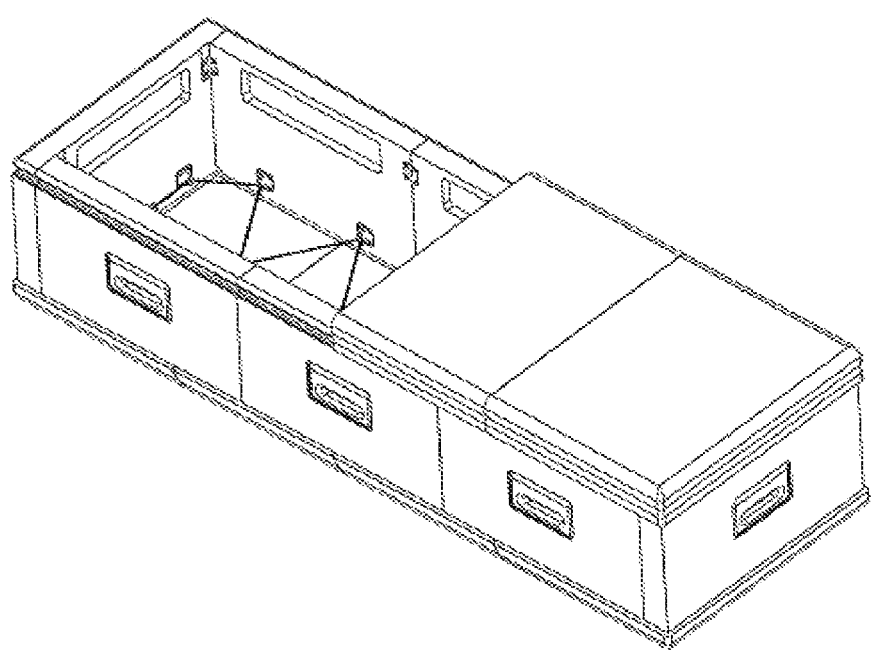
FIG. 8 is a perspective view of the wood casket and lid positioning during a viewing.

FIG. 8 provides one possible arrangement of the lid partitions for viewing purposes. The two head-side partitions can removed and stacked neatly atop the foot-side partitions.

Figure 9:
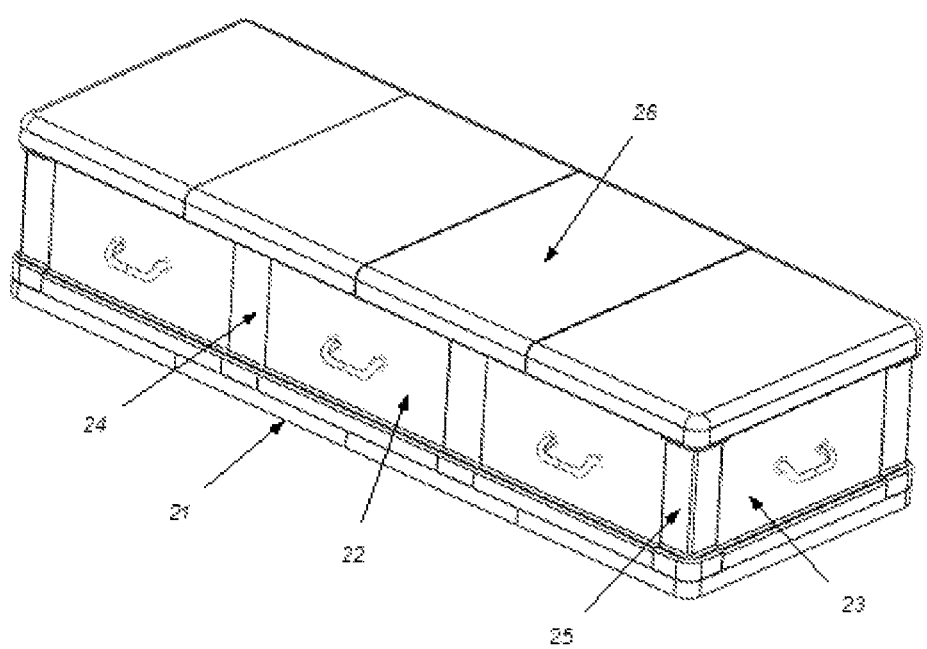
FIG. 9 is a perspective view of the whole contoured steel casket.

A modular casket design using a tension cable system can also be employed in the context of steel, even contoured steel, caskets. A perspective view of the preferred embodiment is provided in FIG. 9. It is comprised of four steel base partitions 21, six steel side panels 22, two steel end panels 23, four side stanchions 24 and four corner stanchions 25, and a foldable lid 26. The specific attachment means include: stud welds bolts, holes and wing nuts.

Figure 10:
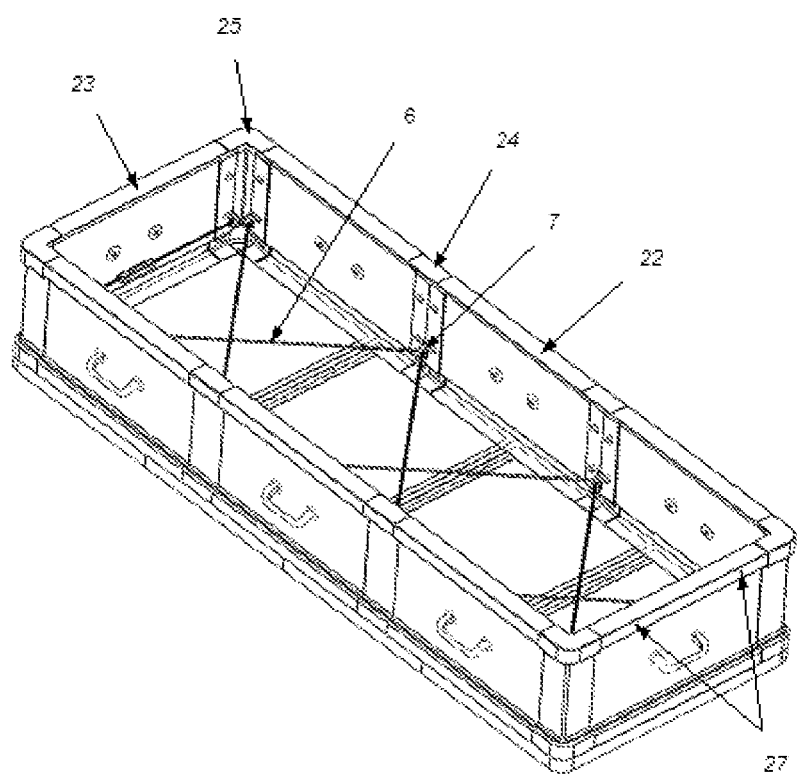
FIG. 10 is a perspective view of the contoured steel casket with the lid removed.

FIG. 10 provides a perspective view of the steel casket without the lid. The same tension cable 6 system employed in the wood design is reproduced here in the steel design. One notable difference is that the tension cable 6 weaves through eyepieces 7 that are mounted to stanchions 24, 25 rather than the panels 22, 23 themselves. This placement of the eyepieces 7 takes advantage of the greater rigidity of the stanchions 24, 25 which will be made of thicker steel than the panels 22, 23. Also, the end panels 23 possess dimples 27 just below the rail of the casket body to facilitate the seating of pins that are mounted within the foldable lid 26.

Figure 11:
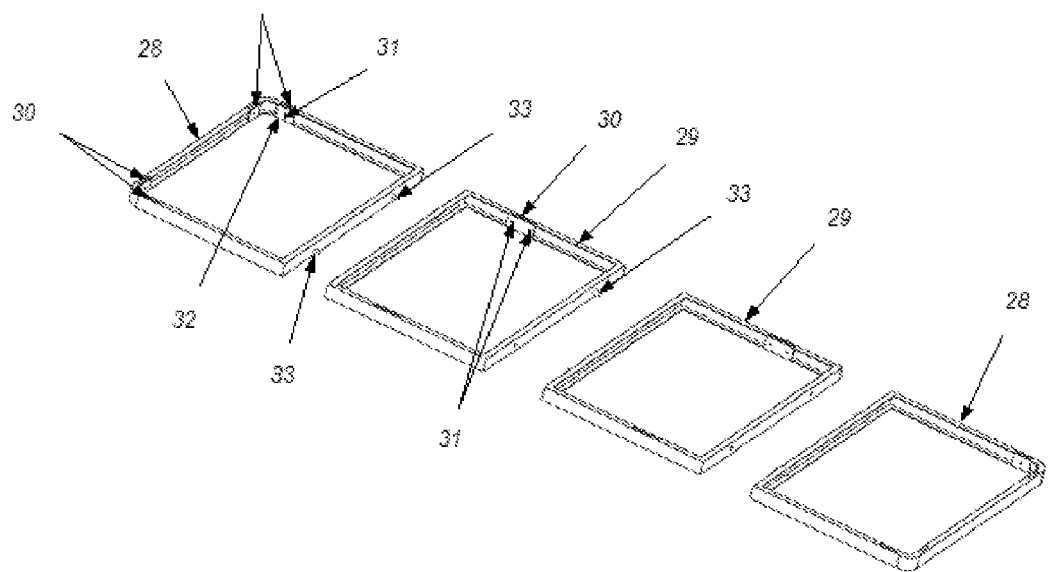
FIG. 11 is an exploded view of the base partitions for the contoured steel casket.

FIG. 11 provides an exploded view of the four steel base partitions. The four steel base partitions are composed of two subsets: end partitions 28 and middle partitions 29. Each end partition 28 is a closed rectangular loop of steel with a C channel cross-section. To accommodate the insertion of the corner stanchions, each end partition 28 has two slits 30 cut out of the top flange of the partition near the casket corners. To anchor the corner stanchion with the partition, bolts will be inserted through holes in the foot mounts of the corner stanchions which align with holes 31 in mount plates 32 that are welded in place adjacent to the slits 30. Wing nuts are sufficient to secure the connection. On the opposite end where the end partition 28 interfaces with its middle partition 29, two pins 33 are arc welded to the outer perimeter and align with holes 31 cut into the web of the middle partition 29. The middle partitions 29 are similar to the end partitions 28, however, they have a single large slit 30 on each side to accommodate the side stanchions. Furthermore, the side facing the end partition 28 is comprised of two holes 31 and the opposite side is comprised of one hole 31 and one pin 33.

Figure 12:
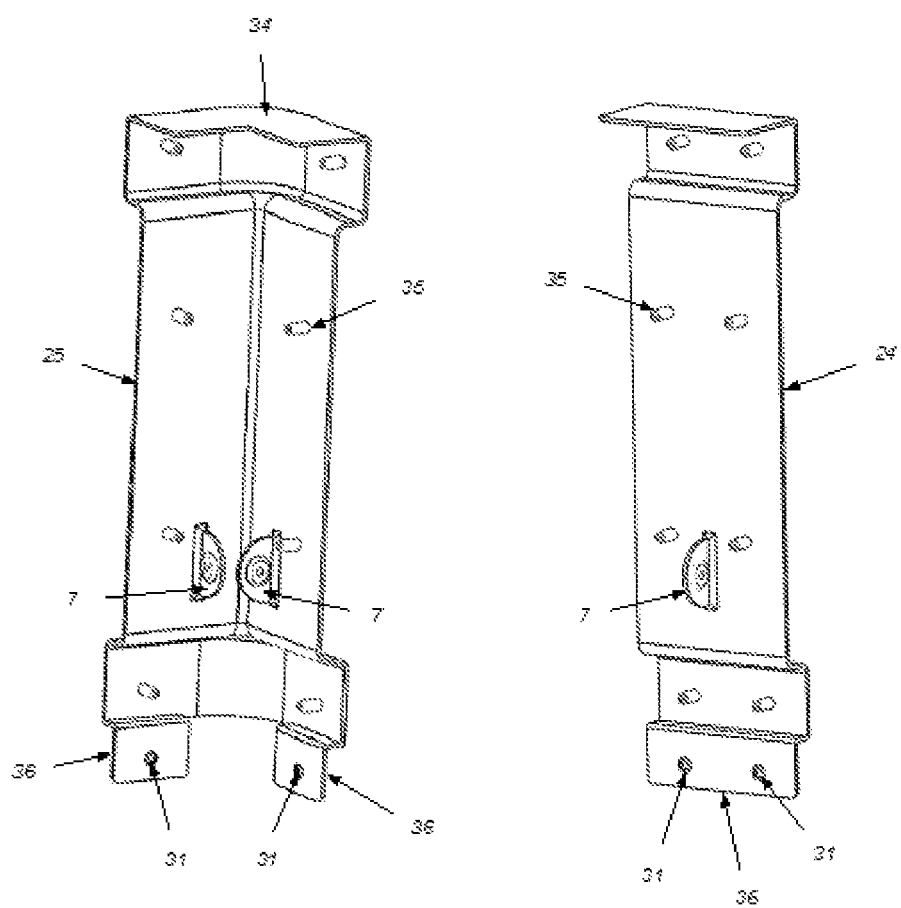
FIG. 12 is a perspective view of the interior faces of a corner and side stanchion for the contoured steel casket.

FIG. 12 shows the interior face of the corner stanchions 25 and the side stanchions 24. The contours in the corner stanchion 25 can be manufactured using standard steel press methods except for the cap piece 34 which will form part of the casket's rail. The cap piece 34 must be manufactured separately and welded onto the remainder of the corner stanchion 25. Holes cut in the lateral ends of the steel panels fit over the stud welds 35 and are secured with wing nuts. Two eyepieces 7 are mounted to each corner stanchion 25. The holes 31 in the two foot mounts 36 at the bottom of the corner stanchion 25 enable attachment to the end partition 28 of the base. The contours in the side stanchion 24 can be manufactured entirely with the use of standard press methods. The side stanchion 24 has one eyepiece 7 and a single foot mount 36 with two holes 31.

Figure 13:
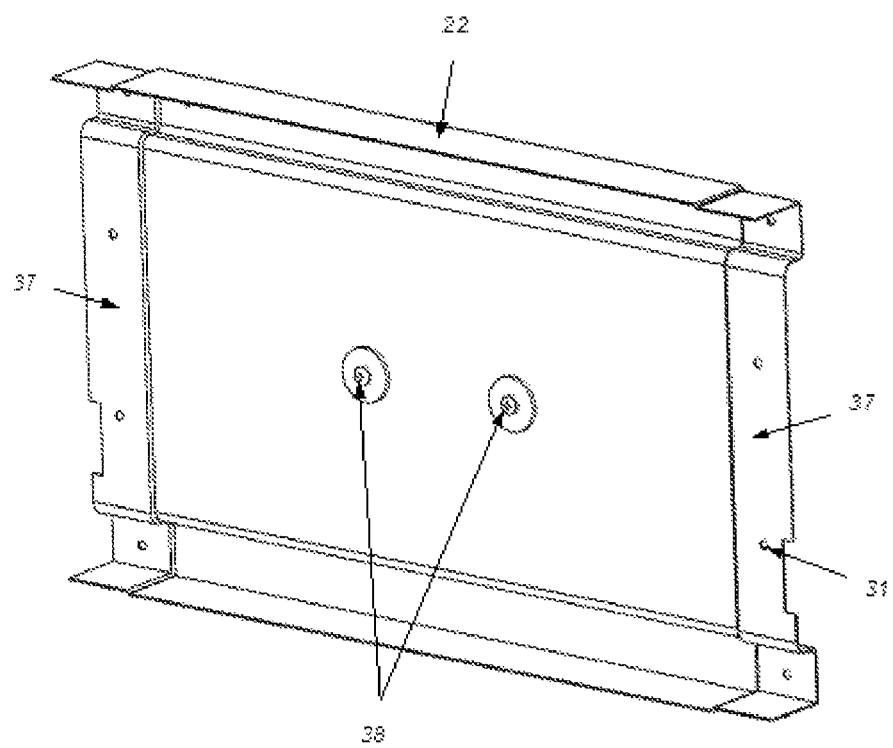
FIG. 13 is perspective view of the interior face of a side panel for a contoured steel casket.

FIG. 13 shows the interior face of a steel side panel 22. The lateral ends 37 are recessed to overlap with the stanchions. The holes 31 fit over the stud welds 35 mounted to the stanchions and the panels are affixed using wing nuts. The handle mounts 38 for the casket are centered on the panel.

Figure 14:
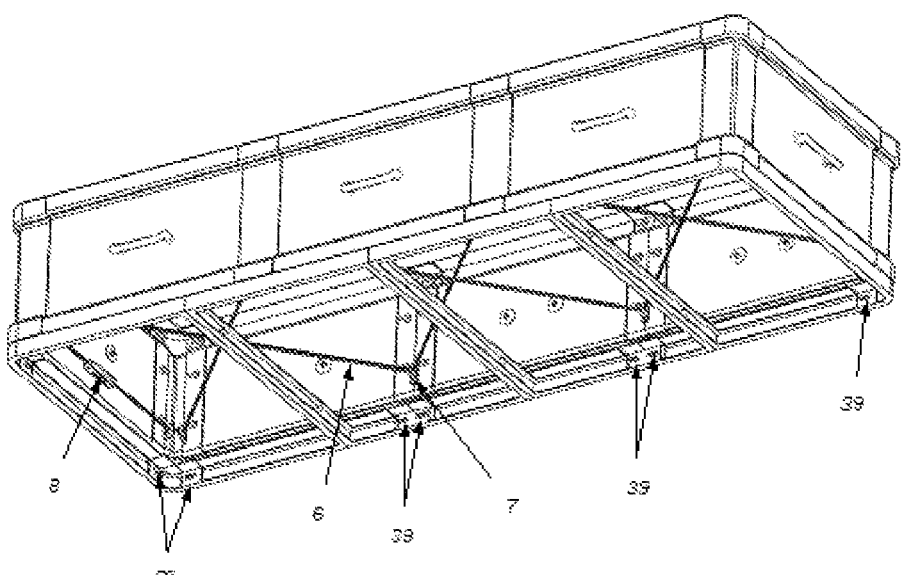
FIG. 14 is a perspective view from the bottom of the contoured steel casket.

FIG. 14 is a perspective view from the bottom of the casket. This angle provides the best view for showing how the entire casket is assembled. The wing nuts 39 affix the stanchions to the base partitions and the panels to the stanchions. The last step in the assembly of the casket body is to weave the tension cable 6 through the eyepieces 7 mounted to the stanchions and tighten the cable with the ratchet 8.

Figure 15:
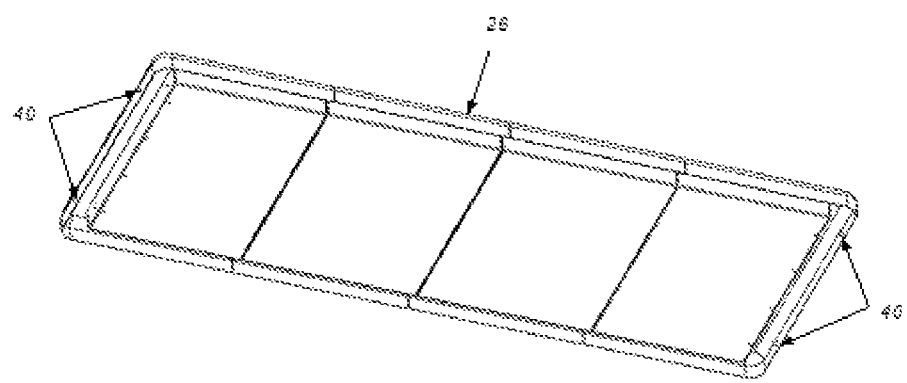
FIG. 15 is a bottom/interior perspective view of the lid for the contoured steel casket.

FIG. 15 is the bottom view of the foldable lid 26. It is comprised of four partitions and each partition is made up of a top and bottom shell made of steel. The outer perimeter of the lid is an extension of the outer shells and this extension fits over the rails of the casket body. The foldable steel lid 26 locks into place when the lid pins 40 mounted at the ends and directed inward engage with dimples on the top exterior of the end panels.

Figure 16:
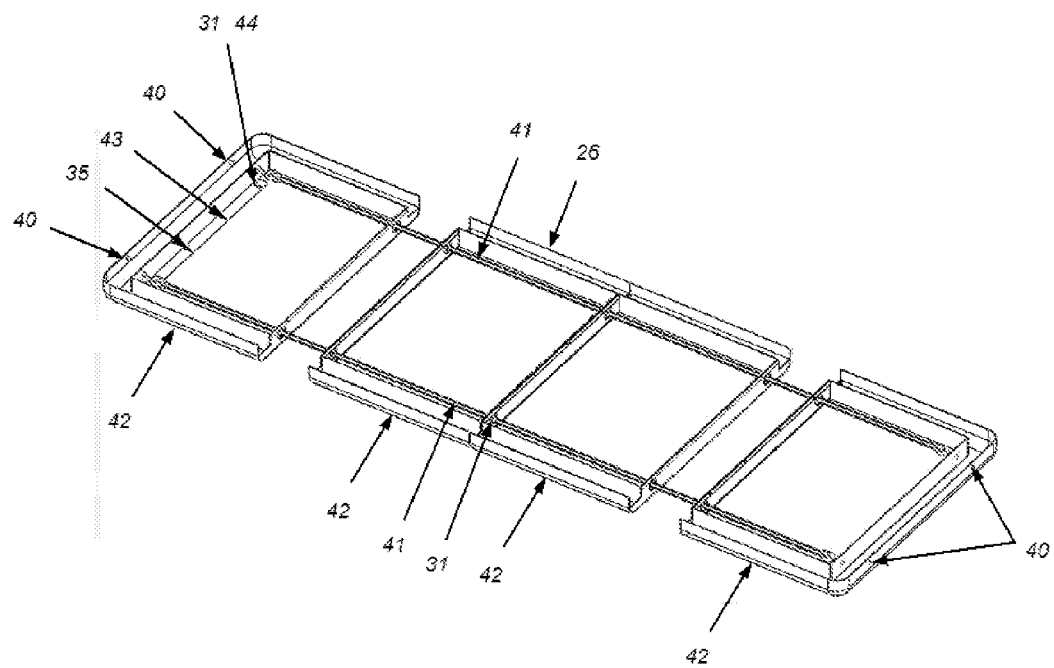
FIG. 16 is a partially exploded, cutaway view of the lid for the contoured steel casket.

FIG. 16 is a partially exploded, cutaway view of the foldable lid 26. The most notable feature are the two elastic chords/bands 41 that enervate all of the partitions. These elastic chords 41 provide a tension on the lid partitions and this functions to both connect the partitions of the lid and maintain sufficient pressure between the end lid partitions 42 so that the lid pins 40 will engage corresponding dimples on the top exterior of the end panels. These elastic chords are anchored directly to the inner shell of the end lid partitions 42. At the far ends, the inner shells have an anchoring flange 43 facing the outer shell with slits 44 that align with stud welds 35 on the outer shell. The slits 44 and studs 35 are fastened with nuts. To access the studs, holes 31 must be cut in the inner shell. After assembly, the holes 31 should be covered with matching plastic hole plugs. Since the remaining partition ends merely have holes 31 to permit the elastic chords 41 to pass through and do not anchor them, the connection between the inner and outer shells are less robust; a large end flange in the outer shell overlaps with a smaller flange from the inner shell and threaded holes in each enables tightening with a small flat-headed screw at the partition seem.

Figure 17:
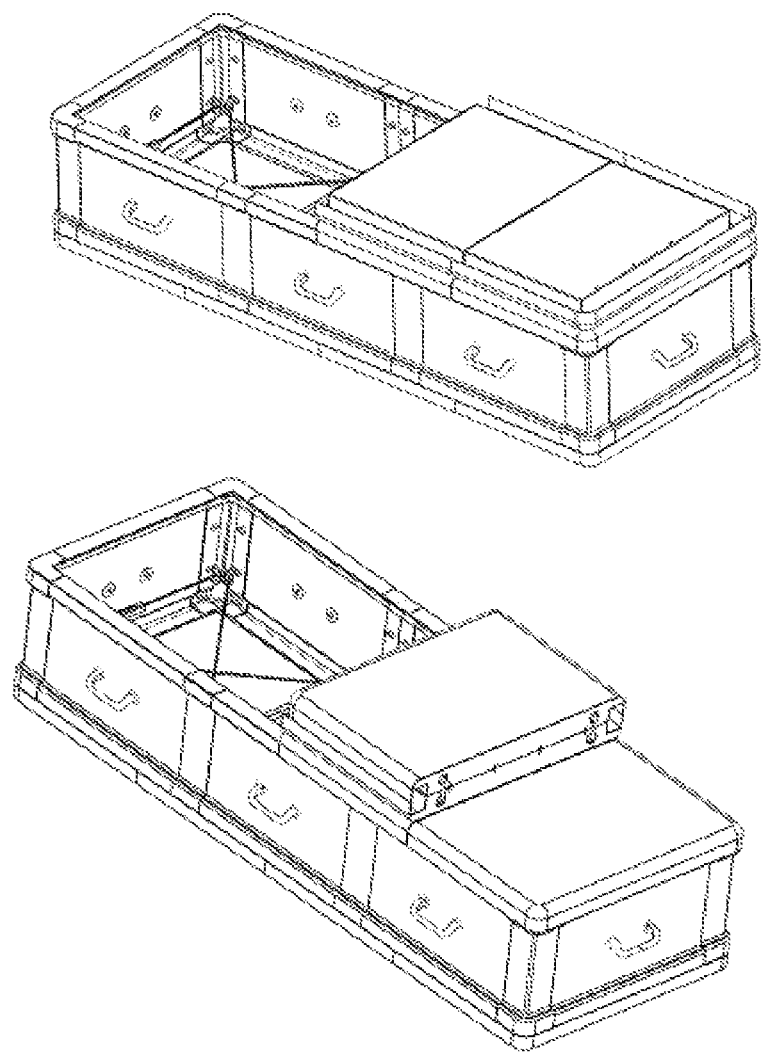
FIG. 17 is a perspective view of two possible ways in which the partitions comprising the lid for the contoured steel casket can be stacked for a viewing.

FIG. 17 shows two alternative ways of stacking the lid partitions during a viewing.

Figure 18:
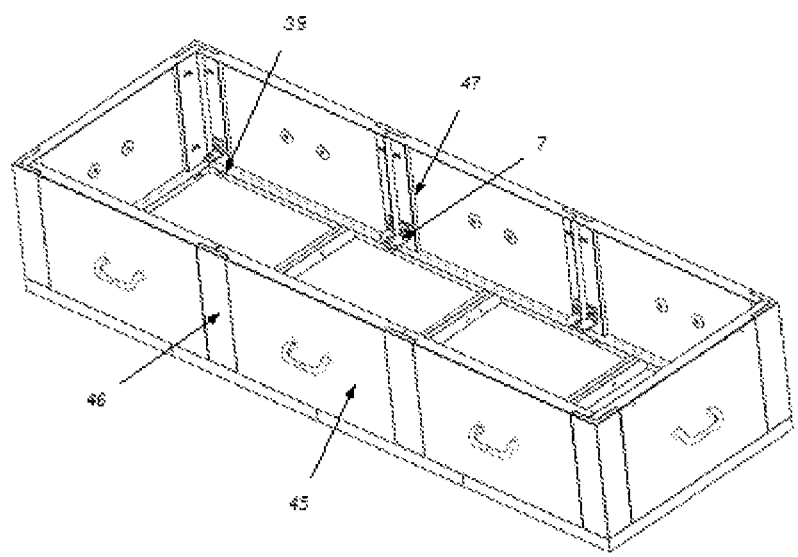
FIG. 18 is perspective view of a simple sheet metal casket without the lid and without the tension cable webbing.

FIG. 18 shows a perspective view of a metal casket made entirely of sheet metal. Since each sheet metal panel 45 and stanchion 46 has flanges 47 on all sides to add rigidity to the thin sheets of steel, this design is not conducive to contouring. Nevertheless, it provides a very low cost means of building a steel modular casket. Assembly is very similar to the contoured steel design except that the sheet metal panels 45 overlap the sheet metal stanchion 46 to the interior side and this overlap make the sheet metal stanchion 46 invisible from the interior. Furthermore, the eyepieces 7 are separate from the sheet metal stanchions 46 and the same lower wing nut 39 is used to affix the individual eyepiece 7, panel 45 and stanchion 46.

Figure 19:
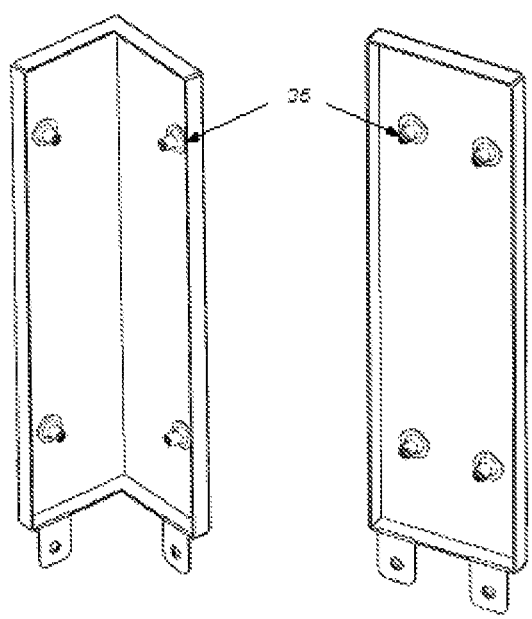
FIG. 19 is a perspective view of the interior faces of a corner and side stanchion for the simple sheet metal casket.
Figure 20:
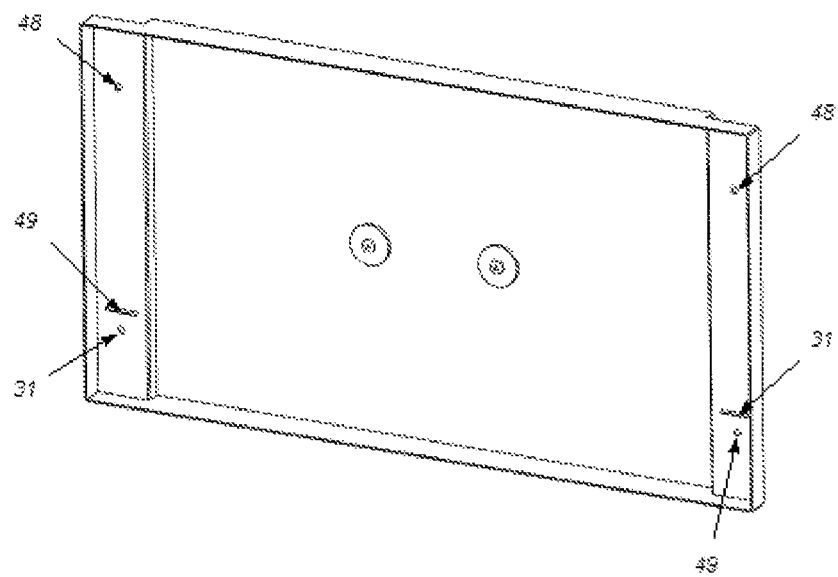
FIG. 20 is a perspective view of the interior face of a side panel for the simple sheet metal casket.

FIG. 19 shows the interior face of a corner and side sheet metal stanchion. Welding will be necessary to adjoin the flanges at the corners; welding will strengthen the corners and provide a better appearance. The sheet metal design uses stud welds 35 just like the contoured steel design. FIG. 20 is the interior face of a sheet metal panel. The recessed lateral ends 48 are made to accommodate the depth of the sheet metal stanchion. The slits 49 above the lowest holes 31 are there to seat and align the eyepieces 7 before the wing nuts 39 permanently affix the position. As with the stanchion, the corners should be welded.

I claim:

1. A modular casket for a deceased, comprising: opposing side panels having an exterior and interior face; opposing end panels having an exterior and interior face; wherein the side panels and the end panels cooperate to define a casket interior for receiving the deceased; eyepieces directly attached to a lower portion of the interior face of each of the side panels and each of the end panels, or alternatively, the eyepieces are directly attached to a lower portion of stanchions seated in between the side and end panels; and a tension cable system which weaves through each of the eyepieces and forms a frameless web that defines an elevated floor of the casket for supporting all of the weight of the casket interior.

2. The modular casket as in claim 1, comprising:
    a.) the side and end panels with half hinges mounted to the upper interior face of each panel and each of these half hinges mate with opposing half hinges on adjacent panels when a hinge pin is inserted.

3. A modular casket for a deceased, comprising: opposing side panels having an exterior and interior face; opposing end panels having an exterior and interior face; wherein the side panels and the end panels cooperate to define a casket interior for receiving the deceased; eyepieces directly attached to a lower portion of the interior face of each of the side panels and each of the end panels, or alternatively, the eyepieces are directly attached to a lower portion of stanchions seated in between the side and end panels; a tension cable system which weaves through each of the eyepieces and forms a frameless web that defines an elevated floor of the casket for supporting all of the weight of the casket interior; and a base comprised of a plurality of self-aligning rectangular partitions that attach to the bottom of the side and end panels.

4. The modular casket as in claim 3, comprising:
a.) the side and end panels with half hinges mounted to the upper interior face of each panel and each of these half hinges mate with opposing half hinges on adjacent panels when a hinge pin is inserted.

5. The modular casket as in claim 3, comprising:
a.) the side and end panels with half hinges mounted to the upper interior face of each panel and each of these half hinges mate with opposing half hinges on adjacent panels when a hinge pin is inserted; and
b.) the base having partitions possessing beveled joints therebetween that are attached with flexible fabric strip hinges with alternating bottom-top-bottom joint mount orientations enabling an accordion fold.

6. The modular casket as in claim 3, comprised of steel or other metal alloy with the tension cable system anchored to the eyepieces mounted to the stanchions and the stanchions attach to the base with nuts and bolts; and the side or end panels fit in between, overlap and attach to the stanchions using stud welds, holes and nuts.

7. A modular casket for a deceased, comprising: opposing side panels having an exterior and interior face; opposing end panels having an exterior and interior face; wherein the side panels and the end panels cooperate to define a casket interior for receiving the deceased; eyepieces directly attached to a lower portion of the interior face of each of the side panels and each of the end panels, or alternatively, the eyepieces are directly attached to a lower portion of stanchions seated in between the side and end panels; a tension cable system which weaves through each of the eyepieces and forms a frameless web that defines an elevated floor of the casket for supporting all of the weight of the casket interior; a base comprised of a plurality of self-aligning rectangular partitions that attach to the bottom of the side and end panels; and a foldable casket lid in which partitions comprising the lid are attached to each other with one or more elastic bands or chords in which each elastic band or chord enervates all of the partitions and the lid is seated atop of the side and end panels.

8. The modular casket as in claim 7, comprising:
a.) the side and end panels with half hinges mounted to the upper interior face of each panel and each of these half hinges mate with opposing half hinges on adjacent panels when a hinge pin is inserted.

9. The modular casket as in claim 7, comprising:
a.) the side and end panels with half hinges mounted to the upper interior face of each panel and each of these half hinges mate with opposing half hinges on adjacent panels when a hinge pin is inserted; and
b.) the base possessing beveled joints between each partition that are attached with flexible fabric strip hinges with alternating bottom-top-bottom joint mount orientations enabling an accordion fold.

10. The modular casket as in claim 7, comprising:
a.) the side and end panels with half hinges mounted to the upper interior face of each panel and each of these half hinges mate with opposing half hinges on adjacent panels when a hinge pin is inserted; and
b.) the base having partitions possessing beveled joints therebetween that are attached with flexible fabric strip hinges with alternating bottom-top-bottom joint mount orientations enabling an accordion fold; and
c.) the lid comprised of partitions that slide onto the casket body using a tongue and groove system.

11. The modular casket as in claim 7, comprised of steel or other metal alloy with the tension cable system anchored to the eyepieces mounted to the stanchions and the stanchions attach to the base with nuts and bolts; and the side or end panels fit in between, overlap and attach to the stanchions using stud welds, holes and nuts.

* * * * *